United States Patent [19]

Fox

[11] 4,165,849
[45] Aug. 28, 1979

[54] COMBINATION AIR BRAKE AND ENGINE SHIELD FOR AIRCRAFT

[76] Inventor: Anthony Fox, 8306 Queen Ave. South, Minneapolis, Minn. 55431

[21] Appl. No.: 860,588

[22] Filed: Dec. 14, 1977

[51] Int. Cl.² .............................................. B64C 9/32
[52] U.S. Cl. ................... 244/113; 244/53 B
[58] Field of Search ................. 244/53 B, 113, 110 D; 60/39.09 P

[56] References Cited

U.S. PATENT DOCUMENTS

| | | | |
|---|---|---|---|
| 2,138,949 | 12/1938 | Weidman | 244/113 |
| 2,698,149 | 12/1954 | Greenwood et al. | 244/113 |
| 3,168,999 | 2/1965 | Warren et al. | 244/53 B |
| 4,040,580 | 8/1977 | Schwaerzler | 244/113 |

Primary Examiner—Barry L. Kelmachter
Attorney, Agent, or Firm—Orrin M. Haugen; Thomas J. Nikolai

[57] ABSTRACT

A combination air brake and engine shield for a jet powered aircraft. A hydraulically operated, hinged shield member, shaped so as to conform to the surface of the aircraft fuselage when in its retracted position, may be swung outwardly therefrom so as to be disposed in front of the air intake of the jet engine powering the craft, to thereby divert any foreign objects from being drawn into the intake and damaging the engine. The same arrangement may also serve as an air brake to effect deceleration of the aircraft. Spring loaded louvers are provided in the shield to permit sufficient air to reach the engine such that problems due to cavitation are avoided.

1 Claim, 8 Drawing Figures

COMBINATION AIR BRAKE AND ENGINE SHIELD FOR AIRCRAFT

BACKGROUND OF THE INVENTION

I. Field of the Invention

This invention relates generally to apparatus for shielding the intake of a jet engine, and more specifically to the design of a shield which may be selectively deployed in a blocking orientation with respect to a jet engine inlet and which may also be employed as an air brake for reducing the speed of a jet powered aircraft.

II. Description of the Prior Art

Prior art jet aircraft have commonly employed hydraulically operated flaps which may be deployed to create a surface substantially normal to the streamlines of the aircraft to thereby greatly increase the wind resistance encountered by the aircraft during its flight. These flaps are commonly referred to as "air brakes".

Airplane crashes have been attributed to jet engine failure occasioned by foreign matter entering the air intake of the engine. Lives have been lost when aircraft have encountered flocks of birds, heavy hail and the like. Accordingly, it is deemed desirable to provide a shield which will divert any such foreign objects from entering the intake of a jet engine. However, it is a requirement that the shield not preclude the flow of air into the intake in quantities necessary to provide proper combustion. Then too, it has been found that if the air pressure at the intake of the jet engine is reduced, a phenomenon known as "cavitation" may take place wherein the working parts of the engine may be pitted and eroded, unduly necessitating frequent overhaul and repair.

SUMMARY OF THE INVENTION

In accordance with the teachings of the present invention, I provide a combination air brake and engine shield which, when not in use, conforms to the profile of the aircraft, but which when deployed, presents a relatively flat surface normal to the streamlines of the aircraft. This arrangement is disposed on the aircraft in proximity to the intake of the jet engine used to power the craft such that when it is deployed, foreign matter of a predetermined size and mass will be diverted past the engine intake. The air brake/diverter appendage is provided with louvers or slots having spring loaded flaps disposed in a blocking relationship with respect to the slots such that when the pressure differential exceeds a force value determined by the springs employed, the flaps will open to permit an increase in the flow of air reaching the engine intake. The slots or louvers are dimensioned such that foreign objects of a size which could cause damage to the engine are precluded from passing through them. The increased airflow through the louvers is sufficient to prevent the cavitation phenomena.

The foregoing and other features and advantages of the invention will become apparent to those skilled in the art from the following detailed description of the preferred embodiment when considered in conjunction with the accompanying drawings in which like numerals in the several views identify corresponding parts.

DESCRIPTION OF THE PREFERRED EMBODIMENT

Figure 1:
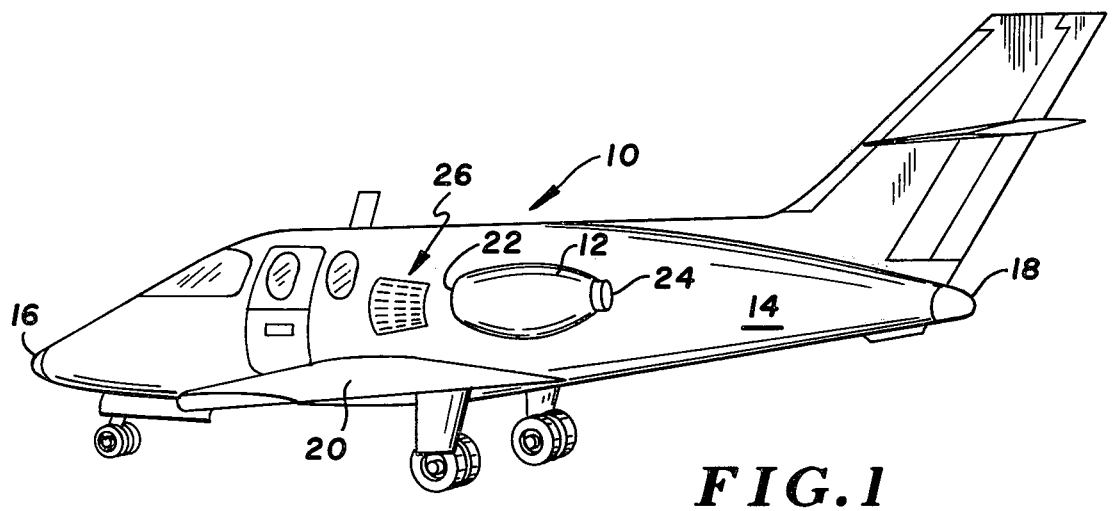
FIG. 1 is a perspective view of the aircraft on which the present invention may find application.

Referring first to FIG. 1, there is indicated generally by the numeral 10 a jet-type aircraft having jet engines 12 attached to the side of the fuselage 14 in an area approximately midway between the nose 16 and the tail 18 and above the wing assembly 20.

The engine 12 has an air intake port 22 and an exhaust port 24. Disposed forward of the engine intake port 22 and generally in line therewith is the air brake/diverter panel which is indicated generally by the numeral 26.

Figure 2:
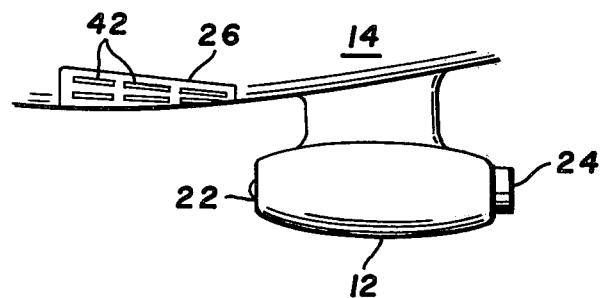
FIG. 2 is a partial view of one side of the fuselage showing the orientation of the preferred embodiment with respect to its jet engine when the air brake/diverter panel is in its stowed position.
Figure 3:
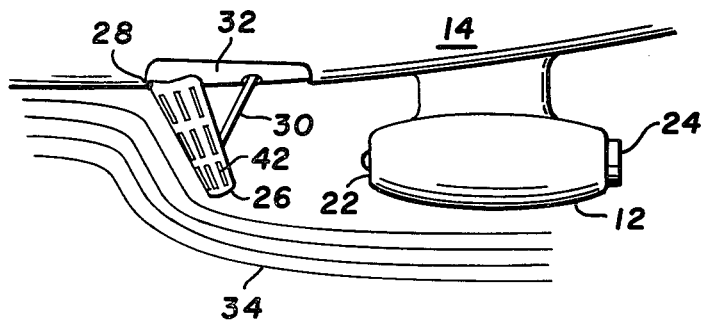
FIG. 3 is a view similar to that of FIG. 2 only with the air brake/diverter panel in its deployed position.
Figure 4:
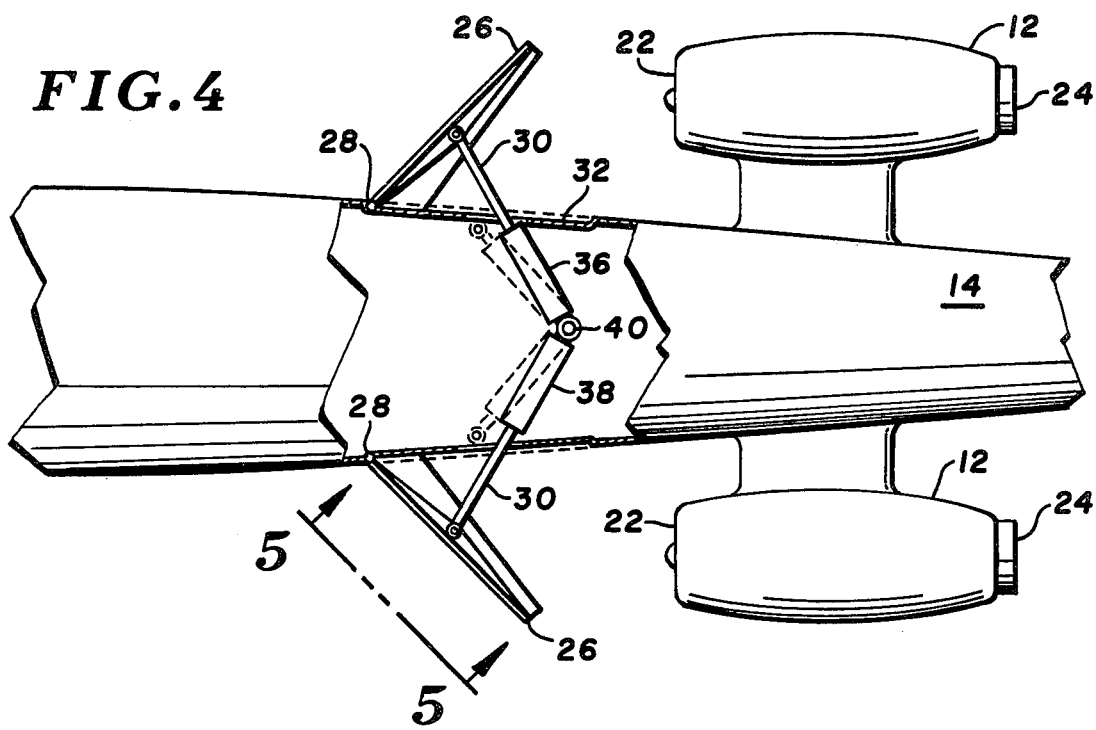
FIG. 4 is a top cross-sectional view illustrating the actuating mechanism for the air brake/diverter panels.
Figure 5:
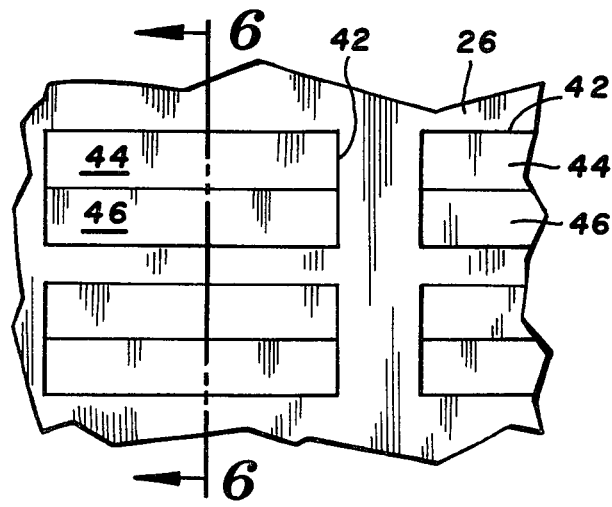
FIG. 5 is a detailed view taken along the lines 5—5 in FIG. 4.

As is indicated in FIGS. 1 through 3, the surface of the air brake/diverter panel 26 is shaped so as to conform to the profile of the fuselage 14 in the area in which it is disposed and when it is in its stowed condition (FIG. 2). As will be described more fully hereinbelow when the details of FIG. 4 are considered, the panel 26 has a hinge member 28 along its forward edge which can best be seen in the view of FIG. 3. Actuating means in the form of a hydraulically operated piston rod 30 is provided for deploying the air brake/diverter panel 26 outwardly about the hinge 28. Also, with reference to FIG. 3, it can be seen that the fuselage 14 is provided with a recess 32, the recess being shaped to conform generally to the curved profile of the panel 26 such that when the panel 26 is in its stowed position (FIG. 2) it does not project beyond the normal profile of the fuselage 14.

When the panel 26 is swung outwardly as depicted in FIG. 3, it will be noted that the panel 26 is disposed in front of the engine inlet port 22 such that the airstream indicated by numeral 34 which normally follows the profile of the fuselage 14 is diverted outwardly around the panel 26 and past the engine 12. While some air will find its way around the panel 26 and into the intake 22 of the engine 12, foreign bodies of a substantial mass such as birds, hail, etc. will have sufficient inertia so as to be swept past the intake 22.

Referring now to FIG. 4, there is shown a top cross-sectional view taken generally through the center of the fuselage 14 so as to expose the hydraulic actuator mechanism used to deploy the air brake/diverter panel 26. As is illustrated, first and second hydraulic cylinders 36 and 38, each having a piston 30 disposed therein are pivotally coupled about a hinge pin 40 which is vertically disposed between structural members (not shown) of the fuselage 14. When the pilot activates the hydraulic system, the pistons 30 are forced outwardly from their corresponding cylinders 36 and 38 to rotate the panel members 26 about their hinges 28. The dotted line representations of the piston and cylinders show their general orientation when the panel members 26 are in their stowed position. Again, with reference to FIG. 4, it can be seen that when the panels 26 are deployed, they present a substantial surface normal to the streamlines of the fuselage 14 and thereby increase the wind resistance of the aircraft and thereby serve as an air brake. Because of their disposition in front of the intake ports 22 of the engines 12, the panel members 26 also serve as diverters for preventing objects of substantial mass from entering into the intake ports 22.

As can be observed from FIGS. 1 through 3, the air brake/diverter panel 26 is provided with a plurality of louvers or slots 42. These slots 42 have disposed in them spring loaded doors or flaps 44 and 46 to normally close off the opening.

Figure 6:
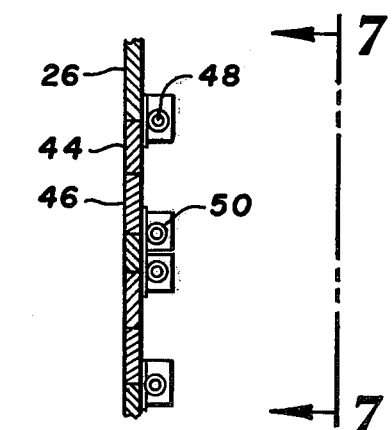
FIG. 6 is a cross-sectional view of the air brake/diverter panel taken along the lines 6—6 in FIG. 5.
Figure 7:
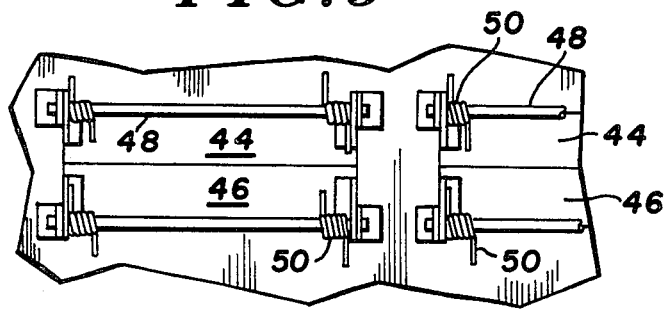
FIG. 7 is a rear view of the air brake/diverter panel taken along the lines 7—7 in FIG. 6.
Figure 8:
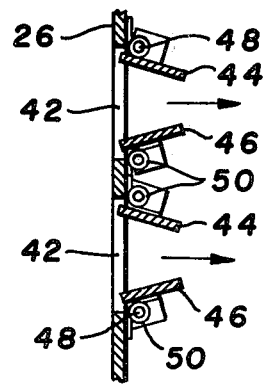
FIG. 8 is a cross-sectional view as in FIG. 6, only with the louver flaps in their open condition.

With reference to FIGS. 6 through 8, it can be seen that each of the flaps 44 and 46 has a laterally extending hinge pin 48 which couples these flaps to the panel 26. Torsion springs 50 are disposed on the hinge pins 48 and abut the panel 26 and the flaps 44 and 46 to normally urge the flaps in a closed relationship with respect to one another and with the openings 42 formed in the panel. The springs 50 are designed to allow the flaps 44 and 46 to open when the pressure differential thereacross increases beyond a predetermined design value. When this occurs, the flaps 44 and 46 open as illustrated in FIG. 8 to permit an increased airflow through the panel members 26 and into the intake port 22 of the engine 12.

The purpose of the spring loaded flaps 44 and 46 in the louvers 42 is to obviate problems associated with the so-called "cavitation" phenomenon. It is well known that in the operation of turbofan-type engines that if at some point in the fluid flow, the existing fluid pressure equals the vapor pressure at the particular temperature, that a cavity or void will form. If the fluid pressure fluctuates slightly above and below the vapor pressure, there will be alternate formation and collapse of the vapor bubbles. The violent collapse (taking place in a very short time) of vapor bubbles can force the fluid at high velocity into the vapor-filled pores of the metal. The sudden stoppage at the bottom of the pore can produce surge pressures of high intensity on small areas. This process is akin to an explosion or implosion. It has been found that these surge pressures can exceed the tensile strength of the metal, and progressively blast out particles and give the metal a spongy appearance. Rapid pitting takes place, often eating holes through metal veins and dangerously weakening the structure.

Thus, when the pressure behind the air brake/deflector panel 26 drops below a predesigned value at which the air is supposed to enter the engine 22, the spring loaded flaps 44 and 46 open to permit an increased airflow to the engine. This increased airflow diminishes the probability of cavitation occurring.

While the preferred embodiment of the invention has been described fully in order to explain the principals of the invention, other modifications and changes will occur to those skilled in the art after they have had the benefit of the teachings contained herein. For example, one may easily devise a corresponding arrangement for use with wing-mounted engines as distinguished from the fuselage mounted engine arrangement illustrated in the drawings. Similarly, alternative means for deploying the air brake/deflector panels, other than the hydraulic cylinder approach illustrated, may used. Thus, the foregoing specification should be considered as illustrative rather than limitive and the true spirit and scope of the invention is to be determined from the following claims.

What is claimed is:

1. A combination air brake and engine shield for a jet-type aircraft comprising, in combination:
  (a) an airframe having a fuselage with wing members structurally attached thereto along a line which is displaced downward and parallel to the longitudinal axis of said fuselage;
  (b) first and second jet-type engines, each having an air intake section and mounted on either side of said fuselage, extending outwardly from the exterior surface thereof and disposed above said wing members;
  (c) first and second recesses formed in the exterior surface of said fuselage, said recesses being oriented completely forward of said air intake sections of said first and second jet-type engines and each having a width generally corresponding to the diameter of said air intake sections, said recesses being generally aligned with the longitudinal axes of said first and second jet-type engines;
  (d) first and second panel members disposed in said recesses and having a hinge connection at one edge thereof about a line which is transverse to the longitudinal direction of said fuselage, said first and second panel members each having an exterior surface conforming to the exterior surface of said fuselage surrounding said recesses and a plurality of slots extending through the thickness dimension thereof, a plurality of flap members yieldably secured to the interior surfaces of said panel members for blocking said slots when the air pressure acting on said flap members is below a predetermined value; and
  (e) first and second hydraulic pistons and cylinders operatively disposed between said fuselage and said first and second panel members and located interior to said exterior surface of said fuselage for rotating said panel members outwardly from said first and second recesses about said hinge connection, the arrangement being such that said panel members, when extended, are in a blocking relationship with the airstream normally entering said intake sections of said jet engines when said panel members are retracted into said first and second recesses.

* * * * *